United States Patent
Brandl et al.

(10) Patent No.: US 9,834,356 B2
(45) Date of Patent: Dec. 5, 2017

(54) COVER FOIL AS A PUSH-THROUGH FOIL FOR A BLISTER PACK

(75) Inventors: Oliver Brandl, Constance (DE); Karl-Heinz Senger, Rielasingen-Worblingen (DE); Erwin Pasbrig, Singen (DE)

(73) Assignee: AMCOR FLEXIBLES KREUZLINGEN LTD., Kreuzlingen (CH)

( * ) Notice: Subject to any disclaimer, the term of this patent is extended or adjusted under 35 U.S.C. 154(b) by 0 days.

(21) Appl. No.: 13/256,758

(22) PCT Filed: Mar. 9, 2010

(86) PCT No.: PCT/EP2010/001469
§ 371 (c)(1),
(2), (4) Date: Sep. 15, 2011

(87) PCT Pub. No.: WO2010/105756
PCT Pub. Date: Sep. 23, 2010

(65) Prior Publication Data
US 2012/0018344 A1    Jan. 26, 2012

(30) Foreign Application Priority Data
Mar. 20, 2009    (CH) ......................... 433/09

(51) Int. Cl.
| | |
|---|---|
| *B65D 83/04* | (2006.01) |
| *B65D 77/00* | (2006.01) |
| *B32B 15/08* | (2006.01) |
| *B65D 75/32* | (2006.01) |
| *B32B 15/20* | (2006.01) |
| *B32B 27/32* | (2006.01) |
| *B32B 7/12* | (2006.01) |
| *B32B 27/08* | (2006.01) |
| *B32B 27/18* | (2006.01) |
| *B32B 27/30* | (2006.01) |

(52) U.S. Cl.
CPC ............. *B65D 75/325* (2013.01); *B32B 7/12* (2013.01); *B32B 15/08* (2013.01); *B32B 15/20* (2013.01); *B32B 27/08* (2013.01); *B32B 27/18* (2013.01); *B32B 27/308* (2013.01); *B32B 27/32* (2013.01); *B32B 2255/06* (2013.01); *B32B 2255/26* (2013.01); *B32B 2264/102* (2013.01); *B32B 2264/104* (2013.01); *B32B 2307/31* (2013.01); *B32B 2307/726* (2013.01); *B32B 2307/7242* (2013.01); *B32B 2307/7246* (2013.01); *B32B 2439/80* (2013.01); *Y10T 428/2804* (2015.01)

(58) Field of Classification Search
CPC ......... B32B 15/08; B32B 27/32; B32B 15/20; B32B 7/12; B32B 27/08; B65D 75/325
USPC ........................ 206/528, 530, 531, 206, 484; 428/35.7–35.9
See application file for complete search history.

(56) References Cited

U.S. PATENT DOCUMENTS

| | | | |
|---|---|---|---|
| 5,078,909 A | | 1/1992 | Shigeta et al. |
| 5,522,506 A | * | 6/1996 | Roulin ................. B65D 75/327 206/531 |
| 6,063,503 A | | 5/2000 | Hatakeyama et al. |
| 6,991,095 B1 | | 1/2006 | Yamasoto |
| 7,758,936 B2 | * | 7/2010 | Spallek et al. ............... 428/34.2 |
| 7,854,225 B2 | * | 12/2010 | Pasbrig et al. ........... 128/203.15 |
| 8,003,179 B2 | * | 8/2011 | Merical et al. ............... 428/35.9 |
| 2003/0235664 A1 | * | 12/2003 | Merical et al. ............... 428/35.7 |
| 2005/0079306 A1 | | 4/2005 | Koyama et al. |
| 2007/0160789 A1 | | 7/2007 | Merical |
| 2008/0058205 A1 | | 3/2008 | Uegaki et al. |

FOREIGN PATENT DOCUMENTS

| | | |
|---|---|---|
| DE | 69018312 T2 | 12/1995 |
| DE | 69634796 T2 | 10/2005 |
| EP | 1733872 | 12/2006 |
| WO | 2008041663 A1 | 4/2008 |

OTHER PUBLICATIONS

International Search Report for PCT/EP2010/001469 dated Jun. 7, 2010.

\* cited by examiner

*Primary Examiner* — Chung Cheung
(74) *Attorney, Agent, or Firm* — Ratnerprestia

(57) ABSTRACT

A cover foil as a push-through foil for a blister pack for packaging moisture-sensitive products has an aluminum foil as the barrier layer against the penetration of water vapor and gases and a sealing layer for sealing against a blister base part. A plastics material layer containing moisture-adsorbing drying agent is arranged on the side of the aluminum foil provided with the sealing layer.

19 Claims, No Drawings

COVER FOIL AS A PUSH-THROUGH FOIL FOR A BLISTER PACK

CROSS-REFERENCE TO RELATED APPLICATIONS

This application is a U.S. National Phase Application of PCT International Application PCT/EP2010/001469, filed 3 Mar. 2010 and published 23 Sep. 2010 in German as WO 2010/105756, which claims priority from Swiss Application 00433/09, filed 20 Mar. 2009, each of which is incorporated herein by reference in its entirety for all purposes.

FIELD OF THE INVENTION

The invention relates to a cover foil as a push-through foil for a blister pack for packaging moisture-sensitive products, with an aluminium foil as a barrier layer against the penetration of water vapour and gases and a sealing layer for sealing against a blister base part.

BACKGROUND OF THE INVENTION

It is generally known to protect products that are sensitive to moisture and oxygen from harmful atmospheric influences by packaging them in plastics materials. Moisture-sensitive products may, for example, be surrounded by a plastics material film which is practically impermeable to water molecules. A film made of a high density polyethylene (HDPE) or made of a polyvinylidene chloride-methylacrylate copolymer (PVDC-MA) can be used as a barrier against the penetration of moisture, for example. Films made of oriented polypropylene (oPP), optionally metallised, or metallised polyester films, are also used as a barrier material against the penetration of moisture. Furthermore, metal films are known as a barrier material against the penetration of moisture and/or oxygen and are often used in a composite with plastics material films. A good barrier effect against water vapour and gases can also be achieved with a layer of ethylene-vinyl alcohol copolymer (EVOH).

Although laminates with barrier layers with a high penetration barrier effect against moisture and oxygen are known nowadays, the penetration of moisture cannot be completely prevented, specifically in sealed packagings, as the edges of the laminates are not protected by the barrier layer. Moisture and oxygen can penetrate by way of these unprotected edges in the region of seals into the interior of hot-sealed packagings and impair the quality of moisture-sensitive products.

Multi-layer films with a barrier layer and with a sealing layer containing moisture-adsorbing material are known from WO-A-2004/080808. The films are used for packaging moisture-sensitive articles, such as, for example, diagnostic test strips, and are either, after folding, sealed against themselves or against a second film. Calcium oxide (CaO) is preferably used as the moisture-adsorbing material with a strong water-binding action.

It is known from WO-A-2007/104344 to use blister packs with a blister base part made of a laminate with a barrier layer against water vapour and gases to package moisture-sensitive products, such as tablets and powders. In addition, a layer made of polyolefin and containing, for example, CaO as the drying agent is arranged on the side of the barrier layer, which is directed against the inside of the blister base part and against a cover foil closing the blister base part. A cover film designed as a push-through foil, for example, has the following layer structure: sealing layer/aluminium foil/print undercoat lacquer/printing/print top coat lacquer.

Typically, a push-through foil of blister packs has an aluminium foil with a thickness of 20 µm in the "hard" state. In order to ensure the push-through capacity even for weaker people, such as, for example, elderly people, the inner layer required inter alia for sealing against a blister base part may not exceed a certain thickness either. A conventional push-through foil with an LDPE coating as the sealing layer is, for example, constructed as follows:

Lacquer, 1 to 2 $g/m^2$/aluminium foil hard, 20 µm/primer 1 $g/m$/LDPE 15 $g/m^2$.

The water absorption capacity of blister base parts with an inner layer containing drying agent is limited because of the thickness of the inner layer which is limited to weights per unit area of the inner layer including the drying agent of typically about 35 to 65 $g/m^2$. The drying agent fraction is typically about 30 to 50% of the total weight per unit area of the layer which is loaded with drying agent. In order to also dry "moist tablets" with the aid of a drying agent, however, as high as possible a water absorption capacity is basically to be aimed for in the blister pack.

SUMMARY OF THE INVENTION

The invention is based on the object of further increasing the water absorption capacity of blister packs for packaging moisture-sensitive products with a cover foil as a push-through foil and with a blister base part having a layer containing drying agent.

The object is achieved according to the invention by a cover film, which is configured with an aluminium foil as a barrier layer against the penetration of water vapour and gases, and a sealing layer for sealing against a blister base part and in which a plastics material layer containing moisture-adsorbing drying agent is arranged on the side of the aluminium foil provided with the sealing layer.

DETAILED DESCRIPTION OF THE INVENTION

The invention utilises knowledge obtained in general from packaging foils and packagings produced therefrom in accordance with WO-A-2004/080808 and from blister base parts in accordance with WO-A-2007/104344.

It has surprisingly been found that the inner layer, i.e. the plastics material layer which is arranged on the side of the aluminium foil provided for sealing against a blister base part and containing drying agent, may have a double to triple thickness compared to the sealable inner layers which are conventional in push-through foils according to the prior art, without reducing the push-through capacity of the foil. The reason for this is that the layer carrying the drying agent has a much higher brittleness in comparison to layers without drying agent. This recognition cleared the way for the first time for the development of the cover foil according to the invention with a substantial and therefore economically sensible content of drying agent.

The plastics material layer containing drying agent preferably contains as the drying agent at least one oxide from the group of alkaline and earth-alkaline metals. A particularly preferred plastics material layer containing drying agent contains, as the drying agent, calcium oxide (CaO), in particular 0.5 to 95% by weight CaO, preferably 10 to 65% by weight.

However, other substances which are suitable as drying agents can also be used, such as, for example, silicates, silica gels, aluminosilicates, physically drying substances, substances taking in water of crystallisation, compounds carrying sugar and hydroxyl groups.

As drying agents are generally present as powders in granular form, care has to be taken that the grains of the drying agent do not press into the aluminium foil and push through these, as holes thus produced in the aluminium foil would destroy the integrity of the blister pack and eliminate the high moisture protection aimed for. Drying agents are generally applied in the form of a master batch carrying drying agent to the aluminium foil by an extrusion or coextrusion method. In this case, the layer thickness of the layer carrying the drying agent may not be too great as otherwise the relatively low expenditure of force, which is above all important for elderly people, is exceeded when a tablet is pushed out and the push-through capacity of the cover foil is lost. In the master batches carrying drying agent and which are commercially available, made, for example, of polyethylene (PE) and CaO, the drying agent has particle sizes $(d_{100})>10$ to 20 µm. Particle sizes of this type are in a position to push through aluminium foils with a thickness of, for example, 20 µm, which are generally used for push-through foils in the "hard" state.

For this reason, it may prove to be expedient to arrange a buffer layer made of plastics material between the aluminium foil and the plastics material layer containing the drying agent.

The plastics material layer containing the drying agent and/or the buffer layer and/or the sealing layer preferably consist of polyolefin, preferably of polyethylene (PE), in particular of a high density polyethylene (HDPE) and/or a linear low density polyethylene (LLDPE) and/or a low density polyethylene (LDPE) and/or polypropylene (PP) and optionally contain components of acid-modified polyolefins, such as ionomers, EAA or PP-MSA. These acid-modified polyolefins act as adhesion promoters, so that in certain cases a separate primer can be dispensed with.

The buffer layer, the plastics material layer containing the drying agent and the sealing layer are preferably formed from a coextrusion layer applied to the aluminium foil.

The aluminium foil may be coated, on the side provided with the sealing layer, with an adhesion promoter, in particular with a water-based or solvent-based primer or with a polymeric adhesion promoter.

A typical structure of a cover foil is, for example:
Lacquer, 1 to 2 $g/m^2$
Aluminium foil 20 µm, hard
Primer, 1 $g/m^2$
LDPE, 12 $g/m^2$ as the buffer layer
PE+drying agent 30 $g/m^2$
LDPE, 4 $g/m^2$ as the sealing layer.

In addition, the cover foil may be printed and the printing may optionally be over-lacquered.

Measurements show that in a plastics material layer containing drying agent, up to a weight per unit area of about 38 $g/m^2$, no impairment of the push-through capacity is ascertained in comparison to a standard push-through foil with the layer structure
Lacquer, 1 to 2 $g/m^2$
Aluminium foil 20 µm, hard
Primer, 1 $g/m^2$
LDPE, 15 $g/m^2$ as the sealing layer.

The invention claimed is:

1. A push-through cover foil for a blister pack having a collapsible blister base part for packaging a moisture-sensitive product, the push-through cover foil comprising:

an aluminium foil as the barrier layer against the penetration of water vapour and gases,
a sealing layer for sealing against the blister base part,
a plastics material layer containing a moisture-adsorbing drying agent arranged on the side of the aluminium foil provided with the sealing layer, and
a buffer layer made of plastic material arranged between the aluminum foil and the plastics material layer comprising the drying agent,
wherein the plastics material layer containing the moisture-adsorbing drying agent has a weight per area in the range of 30 $g/m^2$ to 38 $g/m^2$, and
wherein the cover foil is configured to rupture upon collapsing the blister base part containing the moisture-sensitive product.

2. A cover foil according to claim 1, wherein the drying agent comprises at least one oxide selected from the group consisting of alkaline oxides and alkaline-earth metal oxides.

3. A cover according to claim 2, wherein the plastics material layer comprising drying agent comprises, as the drying agent, calcium oxide (CaO).

4. A cover foil according to claim 1, wherein the drying agent is selected from the group consisting of silicates, silica gels, aluminosilicates, physically drying substances, substances taking in water of crystallisation, compounds carrying sugar and hydroxyl groups.

5. A cover foil according to claim 1, wherein at least one of the plastics material layer containing the drying agent, the buffer layer, or the sealing layer is comprised of polyolefin.

6. A cover foil according to claim 1, wherein the buffer layer, the plastics material layer containing the drying agent and the sealing layer are formed from a coextrusion layer applied to the aluminium foil.

7. A cover foil according to claim 5, wherein the polyolefin is selected from the group consisting of polyethylenes and polypropylenes.

8. A cover foil according to claim 1, wherein the aluminium foil is coated on the side provided with the sealing layer with an adhesion promoter.

9. A blister pack comprising a blister base part and a cover foil according to claim 1, wherein the sealing layer is sealed against the blister base part.

10. A packaged pharmaceutical product, comprising a moisture-sensitive tablet or powder packaged in a blister pack comprised of a blister base part and a cover foil according to claim 1, wherein the sealing layer is sealed against the blister base part.

11. A cover foil according to claim 1, wherein the plastics material layer is comprised of 0.5 to 95% by weight CaO.

12. A cover foil according to claim 1, wherein the plastics material layer is comprised of 10 to 65% by weight CaO.

13. A cover foil according to claim 5, wherein the polyolefin is selected from the group consisting of high density polyethylene (HDPE), linear low density polyethylene (LLDPE), and low density polyethylene (LDPE).

14. A cover foil according to claim 5, wherein the plastics material layer is additionally comprised of at least one acid-modified polyolefin.

15. A cover foil according to claim 8, wherein the adhesion promoter is selected from the group consisting of water-based primers, solvent-based primers, and polymeric adhesion promoters.

16. A cover foil according to claim 1, having a structure:
a). lacquer;
b). aluminium foil as the barrier layer;
c). primer;

d). LDPE as a buffer layer;
e). PE and drying agent as the plastics material layer; and
f). LDPE as the sealing layer.

17. A cover foil according to claim 16, wherein the plastics material layer is comprised of 10 to 65% by weight CaO.

18. A blister pack comprising a blister base part and a cover foil according to claim 16, wherein the sealing layer is sealed against the blister base part.

19. A packaged pharmaceutical product, comprising a moisture-sensitive tablet or powder packaged in a blister pack comprised of a blister base part and a cover foil according to claim 16, wherein the sealing layer is sealed against the blister base part.

\* \* \* \* \*